3,186,829
PROCESS OF PREPARING MAGNETIC PARTICLES
William C. Landgraf, Palo Alto, Calif., assignor to Ampex Corporation, Redwood City, Calif., a corporation of California
No Drawing. Filed Jan. 21, 1963, Ser. No. 252,610
3 Claims. (Cl. 75—0.5)

This invention relates to the manufacture of alloy magnetic powders suitable for use as pigments in the manufacture of magnetic recording tapes. More particularly, the invention relates to a method of making such powders from the oxalates of iron, nickel and cobalt wherein the oxalate is formed by the reaction of an oxalic acid ester with a mixture of metal salts.

It has previously been proposed to react metal salts of nickel, cobalt and iron with oxalic acid in order to produce a mixture of oxalates and then decompose the oxalates in a reducing atmosphere to form magnetic particles. It has been found that the oxalate particles show optimum growth characteristics when the rate of growth is slow. If one employs instead of the oxalic acid an ester of oxalic acid such as dimethyl oxalate, superior results can be obtained since the rate of growth is slow when the ester is employed. In addition, it has been found advantageous to add the ester in small increments to a solution of the metal salts to aid further in maintaining the desired slow rate of growth.

The present invention is carried out by first forming a mixture of metal salts, such as the chlorides or the sulfates of iron, cobalt and nickel, and reacting the salts at room temperature or from slightly below up to about 50° C. with small increments of an ester of oxalic acid, such as dimethyl oxalate, which causes the co-crystallization of the corresponding metal oxalates. The solution is then filtered and the filtrate is washed with water, dried and then placed in a furnace and heated in a reducing atmosphere to reduce the particles to the desired magnetic pigment. The reaction of the ester with the metal salts is preferably carried out at about room temperature, i.e., about 20° C. If the temperature is much below this, the reaction is so slow that the process becomes impractical, while at temperatures above about 50° C., the reaction proceeds quite rapidly, producing inferior results to those obtained at the lower temperatures, and not much better than the results obtained when oxalic acid is used as the reactant. Thus, at 50° C., the $B_m$ value was 65% of that obtained at 20° C., while at 90° C. the $B_m$ value had dropped to less than 50% of the value obtained at room temperature.

Generally speaking, it is preferred to use from 30 to 55 mole percent of cobalt, from 40 to 70 mole percent of iron and from 5 to 20 mole percent nickel.

The following non-limiting examples illustrate preferred embodiments of the present invention.

*Example 1*

A mixture was made containing 11.9 grams $NiCl_2 \cdot 6H_2O$, 119 grams $CoCl_2 \cdot 6H_2O$ and 89.5 grams $FeCl_2 \cdot 4H_2O$ (0.05 mole, 0.50 mole and 0.45 mole respectively). This mixture was added to 12 liters of distilled water and stirred. Stirring was continued at room temperature while there was added 144 grams of dimethyl oxalate (1.2 moles) in several small increments. Agitation was continued for a period of 16 hours during which time a precipitate formed on the bottom. The precipitate was recovered by filtration and was then washed three times with distilled water, twice with methanol and was then dried four hours at 100° C. Thirty-one grams of the precipitate was then placed in a furnace, heated at 390° C. for 24 hours under an atmosphere of hydrogen gas. After this period, the particles were cooled and recovered. They were then mixed with a toluene solution of an organic polymer and thereafter coated on a thin plastic tape. The magnetic properties were evaluated using a 60 cycle hysteresis loop tracer and $B_r$ and $B_m$ values were found to be 75% to 100% higher than similar particles which have been prepared utilizing oxalic acid as the reagent. The $B_m$ value was 4800 gauss for particles prepared using dimethyl oxalate, as compared with 2500 gauss for particles precipitated with oxalic acid.

*Example 2*

The process of Example 1 was followed except that the temperature of the reactants was maintained at 45° C. and the metal salts were as follows.

| Mol percent: | Grams |
|---|---|
| .05 $NiCl_2 \cdot 6H_2O$ | 11.9 |
| .70 $FeCl_2 \cdot 4H_2O$ | 139 |
| .35 $CoCl_2 \cdot 6H_2O$ | 82.4 |

A $B_m$ value of 2500 gauss was obtained.

*Example 3*

The process of Example 1 was followed except that the metal salts were as follows.

| Mol percent: | Grams |
|---|---|
| .05 $NiCl_2 \cdot 6H_2O$ | 11.9 |
| .40 $FeCl_2 \cdot 4H_2O$ | 79.6 |
| .55 $CoCl_2 \cdot 6H_2O$ | 131 |

A $B_m$ value of 3200 gauss was obtained.

*Example 4*

The process of Example 1 was followed except that the metal salts were as follows.

| Mol percent: | Grams |
|---|---|
| .20 $NiCl_2 \cdot 6H_2O$ | 47.6 |
| .40 $FeCl_2 \cdot 4H_2O$ | 99.5 |
| .30 $CoCl_2 \cdot 6H_2O$ | 71.4 |

A $B_m$ value of 2700 gauss was obtained.

*Example 5*

The process of Example 1 was followed except that the metal salts were as follows.

| Mol percent: | Grams |
|---|---|
| .05 $NiSO_4 \cdot 6H_2O$ | 13.2 |
| .70 $FeSO_4 \cdot 4H_2O$ | 157 |
| .35 $CoSO_4 \cdot 6H_2O$ | 92 |

A $B_m$ value of 3300 gauss was obtained.

In the above examples, reduction took place at 390° C. since this temperature was found to give a maximum $B_m$ value while higher and lower temperatures yielded reduced $B_m$ values. The coercive force ($H_c$) decreases as the temperature of reduction rises so that material reduced at 390° C. and having an $H_c$ of 500 oersteds would have a value of 1000 oersteds if reduced at 300° C. and 200 oersteds if reduced at 600° C. Thus, the $B_m$ and $H_c$ values can be varied by selecting the reduction temperature.

What is claimed is:
1. The process of preparing finely divided magnetic particles comprising forming an aqueous mixture of iron, nickel and cobalt salts, said salts being selected from the sulfates and chlorides, adding to said mixture dimethyl oxalate to precipitate iron, nickel and cobalt oxalates, separating said precipitate from supernatant liquid and reducing said precipitate by heating the same in an atmosphere of hydrogen at a temperature of from 300 to 600° C.

2. The process of claim 1 wherein the mixture of metal salts comprises from 30 to 55 mole percent of cobalt, from 40 to 70 mole percent of iron and from 5 to 20 mole percent nickel.

3. The process of claim 1 wherein the ester is reacted with the salt at a temperature of from about 20° C. to about 50° C.

References Cited by the Examiner
UNITED STATES PATENTS 2,636,892　4/53　Mayer ---------------- 252—625

FOREIGN PATENTS 419,953　11/34　Great Britain.

BENJAMIN HENKIN, *Primary Examiner.*
WINSTON A. DOUGLAS, *Examiner.*